J. T. ALLMAND.
CONVERTIBLE VEHICLE BODY.
APPLICATION FILED OCT. 18, 1915.

1,230,977.

Patented June 26, 1917.
2 SHEETS—SHEET 1.

INVENTOR
John T. Allmand
BY Rahzemond A. Parker
ATTORNEY

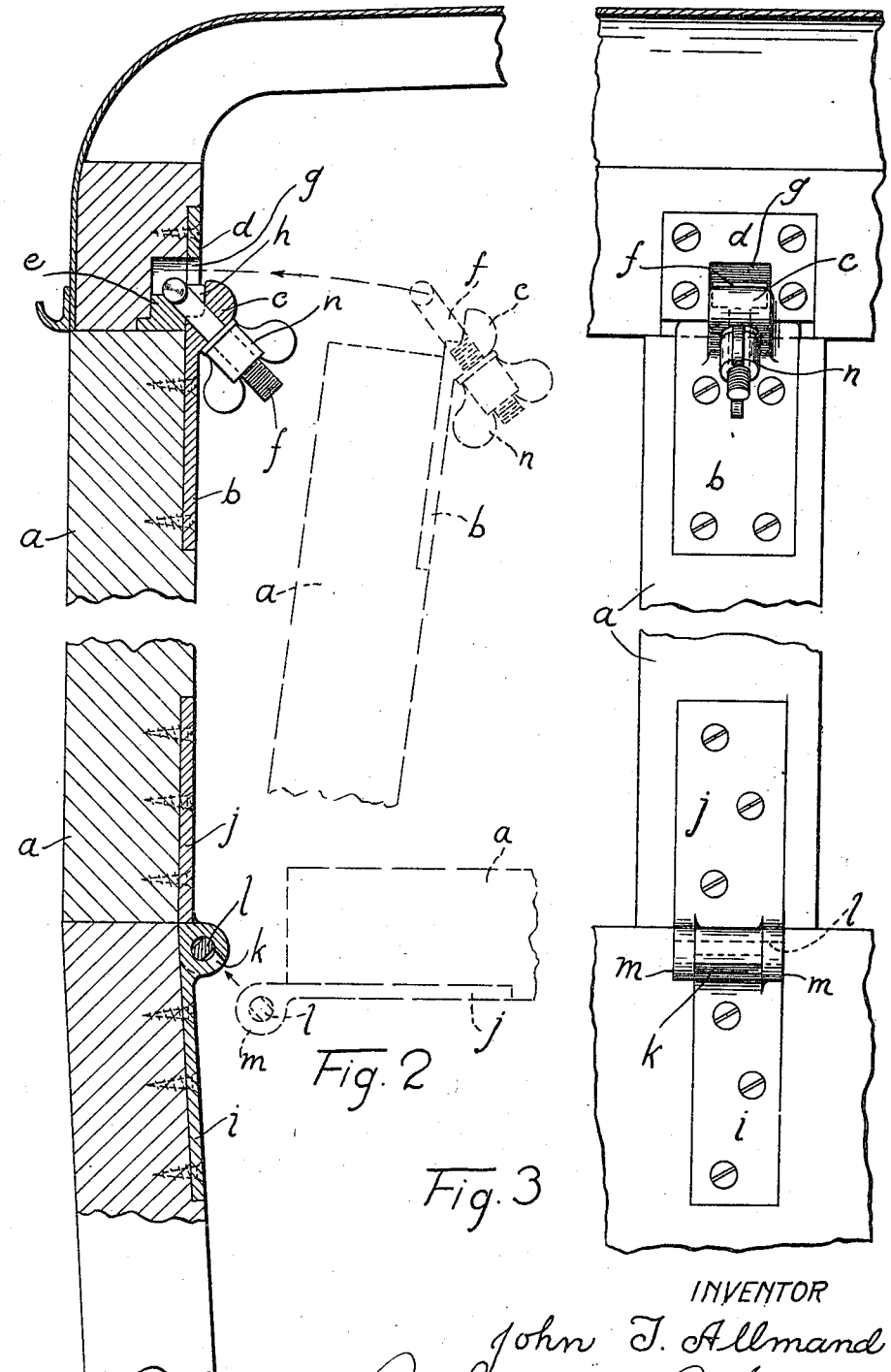

UNITED STATES PATENT OFFICE.

JOHN T. ALLMAND, OF DETROIT, MICHIGAN, ASSIGNOR, BY MESNE ASSIGNMENTS, TO FISHER BODY CORPORATION, A CORPORATION OF NEW YORK.

CONVERTIBLE VEHICLE-BODY.

1,230,977.  Specification of Letters Patent.  Patented June 26, 1917.

Application filed October 18, 1915. Serial No. 56,402.

*To all whom it may concern:*

Be it known that I, JOHN T. ALLMAND, a citizen of the United States, residing at Detroit, county of Wayne, State of Michigan, have invented a certain new and useful Improvement in Convertible Vehicle-Bodies, and declare the following to be a full, clear, and exact description of the same, such as will enable others skilled in the art to which it pertains to make and use the same, reference being had to the accompanying drawings, which form a part of this specification.

This invention relates to convertible vehicle bodies, especially to a body which has a permanent top of the same kind as closed bodies, and is provided with removable window and door posts for the purpose of converting the body from a closed body into a substantially open body. This will more fully appear in the specifications following.

In the drawings,—

Fig. 2 is a vertical section through a portion of the body, including one of the removable posts, showing in dotted lines how the posts can be removed.

Fig. 3 is an inside view of a portion of the body including the removable posts.

Winter automobile driving has made the closed body desirable, and it has been a desideratum of the automobile industry to provide an arrangement that is relatively cheap and which will give the owner of a car an open car for the warmer months and a closed car for the colder months. To this end bodies have been designed which have a complete top which lifts off of the lower portion of the body, and bodies have been designed which have windows and window posts which fold either down on the insides of the lower portion of the body, or else fold up and are locked to the inside of the top. Now, these latter arrangements result in the posts and the windows being exposed and in the way.

My present invention is so designed that the windows and the posts when the posts are taken out of the body are completely concealed. This I accomplish by the complete removal of the window and door posts. The windows themselves may then be dropped into the window pockets which are provided in every closed automobile body, or else they may be taken completely out and stored in a convenient receptacle and carried on the car, or for that matter, can be left in the garage.

Figure 1:
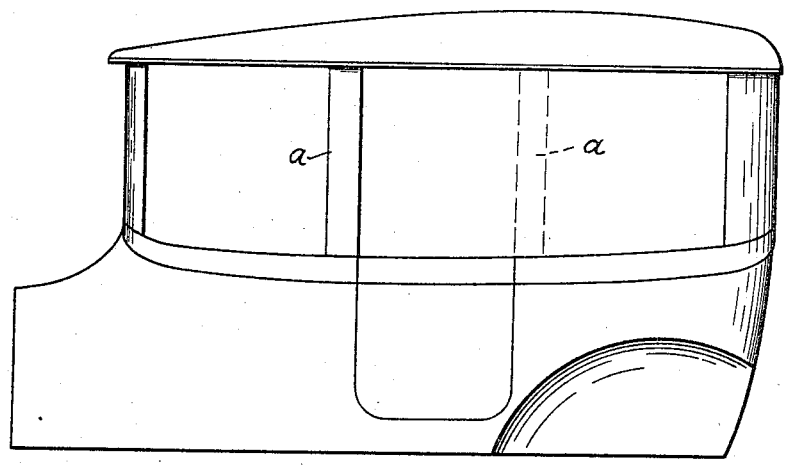
Figure 1 is a view of the body having one post in place and showing in dotted lines where the other post is located.

In Fig. 1 the type of body known as the sedan is shown. It will be noted that this body is provided with the conventional lower portion of the sedan and the conventional permanent top of the sedan, the differences being that the door and window posts can be completely taken out and hence the windows either dropped in the window pockets or completely removed.

Figure 4:
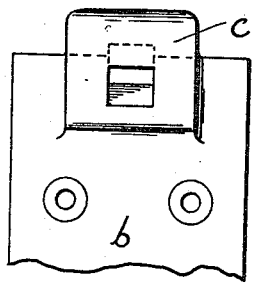
Fig. 4 is a fragmentary view of the top end of the post plate.

The door posts can be removed by reason of the devices shown in Figs. 2 and 3. $a$ indicates the window and door post provided at its top and on the inside with a post plate $b$. This post plate has at its top, as is clearly shown in Fig. 4, a perforated obliquely-upwardly extending lug $c$. The side of the lug toward the door post is provided with a recess to fit a companion projection on the top plate $d$, that is, the plate of the interlocking device which is screwed to the permanent top of the body.

Figure 5:
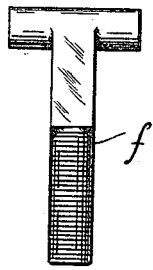
Fig. 5 is a detail of the T-bolt.
Figure 7:
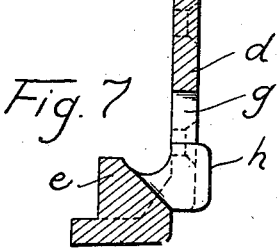
Fig. 7 is a vertical section of the same on the line A—A of Fig. 6.
Figure 6:
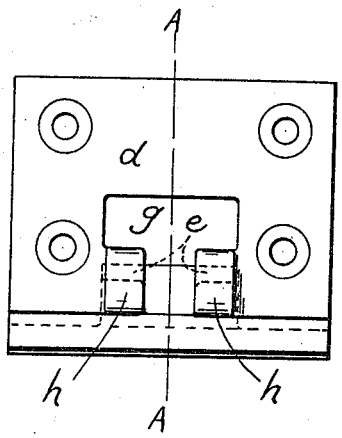
Fig. 6 is a detail of the top plate.

The nature of the top plate $d$ is shown by Figs. 6 and 7. Fig. 6 is a view of this top plate looking at it from the side that abuts against the top when the same is screwed in place. It comprises a casting of the peculiar conformation shown in Figs. 6 and 7. The casting comprises a pair of inwardly-extending projections $e$ which form a cradle to receive the ends of the T-bolt $f$ (Fig. 5). This top plate $d$ is provided with a T-slot $g$ through the top of which the head of the T-screw may enter to drop into the cradle $e$. At the sides of the bottom of the T-slot projections $h$ project slightly outward from the general exposed face of the plate when the same is screwed to the top.

Now, before explaining how these various parts go together, it is well to explain the detachable hinge used at the bottom of the removable door and window post. This is shown in Figs. 2 and 3 and comprises simply a pair of straps $i$ and $j$. The strap $i$ is fastened to the inside of the body and has the center knuckle of the three knuckles which form the hinge. The center knuckle is provided with a narrow longitudinal slot $k$ through which may be removed the knuckle pin $l$ which is fast to the two outside knuckles $m$ of the post strap $j$. It will be seen that this knuckle pin $l$ instead of being entirely cylindrical has two flat parallel sides. Consequently when the door and window post is swung down to the position shown in the lower dotted lines of Fig. 2, this knuckle pin is in such position that it can be drawn out through the slot $k$, thereby detaching the lower end of the post from the body.

The post is put in place and removed in the following manner: Assuming the post about to be put in place, the same is turned to the position shown in the lower dotted lines of Fig. 2, the knuckle pin slipped into the central knuckle, the post is then turned upon its hinge to the position shown in the upper dotted line showing of Fig. 2, the T-bolt may be inserted through the perforation of the lug $c$, and the winged nut $n$ run on its threads, or for that matter, this might have been done previously as there is really no occasion to remove these members from the post plate after the same have been assembled.

From the position shown in the upper dotted line showing of Fig. 2, the post is swung against the top of the body and the head of the T-bolt guided through the enlarged portion of the T-slot $g$ of the top plate $d$. The head of the T is then allowed to drop into the cradle $e$ in the rear of the top plate $d$. Now, by tightening the winged nut $n$ on the bolt, the post plate and the top plate may be securely brought together and the length of the T-bolt above the post plate so shortened that there is no possibility of the escape of the head of the T-bolt through the slot where it was inserted. In fact, the winged nut may be tightened upon the bolt so tight that there is absolutely no play between the members, thereby preventing all rattle.

It is evident that the posts may be detached by merely reversing the operations described in attaching it.

What I claim is:

1. In a vehicle body provided with a top, the combination of door and window posts having at one of their ends removable hinged connections, parts of which may be removed to allow the removal of the posts, and having at their other ends a separable locking device.

2. In a vehicle body provided with a top, the combination of door and window posts, a separable locking and tension device for securing the top of each post to the top of the body, and a separable hinge for connecting the lower end of each post to the vehicle body.

3. In a vehicle body provided with a top, the combination of removable door and window posts, separable hinges for the lower ends of said door and window posts each comprising one strap with a pair of knuckles carrying a flat-sided knuckle pin and a second strap provided with a knuckle having a longitudinal opening through which the knuckle pin can escape when the straps are brought to a given angular position, and means for interlocking the tops of the posts with the permanent top of the vehicle.

4. In a vehicle provided with a top, the combination of a plurality of removable door and window posts, means for detachably securing the lower ends of the posts to the body and detachable interlocks for the tops of the posts, each interlock comprising a plate secured to the vehicle top and having a slot therethrough provided with an enlarged opening and having a cradle at the rear, a plate attached to the post and provided with a perforated lug, a threaded bolt with an enlarged head passing through the perforated lug and being arranged so that its enlarged head fits into the cradle of the top plate, and a nut on the end of the bolt.

5. In a vehicle body provided with a top, the combination of a plurality of removable door and window posts, means for detachably securing the bottoms of the posts to the body and separable interlocks for the tops of the posts, each comprising a post plate provided with a perforated lug, a top plate provided with a T-slot and a cradle in the rear, a threaded T-bolt engaging through the perforation in the lug and the T-head of which is adapted to pass through the T-slot in the top plate and rest in the cradle at the rear of the top plate, and a nut running on the threaded end of the T-bolt.

6. In a vehicle body provided with a top, posts for holding the windows at the sides, parts of locking devices secured to the top, detachable parts of said locking devices secured to the tops of the posts and engageable with said first-mentioned parts, portions of securing devices carried by the body and detachable portions of securing devices attached to the bottoms of the posts and engageable with the first-mentioned portions of said securing devices, the said locking devices and securing devices being arranged so that the one has to be first released and a post tipped to an angular position before the other device can be released.

7. In a vehicle, the combination of a body, a top, removable posts, parts of locking and tension devices secured to the top, detachable parts of said locking and tension devices secured to the tops of the posts and engageable with said first-mentioned parts, portions of securing devices carried by the body, and detachable portions of said securing devices attached to the bottoms of the posts and engageable with the first-mentioned portions of said securing devices, the said posts being thereby removable from the side of the body.

8. In combination with a vehicle body provided with a top, posts for holding the windows at the sides, hinges provided with separable parts for securing the posts removably at one end, and a locking and binding device for removably securing each post at the other end and drawing the same tightly in place.

9. In combination with a vehicle body provided with a top, posts for holding the windows at the sides, parts of locking and binding devices secured to the vehicle body, detachable parts of locking and binding devices secured to one end of the posts and engageable with said first-mentioned parts, portions of securing devices carried by the body, and detachable portions of said securing devices attached to the other end of the posts and engageable with the said first-mentioned portions of the said securing devices, the said locking and binding devices being arranged to draw the posts tightly to the body and take up any looseness in the locking and securing devices.

10. In a vehicle body provided with a top, posts for holding the windows at the sides, means for securing the posts at one end to the body, and locking devices for securing the posts at the other end to the body, said locking devices comprising members which are arranged to both draw the posts laterally of the body into position and to draw the posts longitudinally to tighten them.

11. In a vehicle body provided with a top, posts for holding the windows at the sides, means for securing the posts at one end to the body, and locking devices for securing the other ends of the posts to the body, each of said locking means comprising a tensioning member which has an oblique disposition for the purpose of drawing the post both laterally and longitudinally for the purpose of drawing it into place and also giving it a tension to prevent rattling.

12. In a vehicle body provided with a top, posts for holding the windows at the sides, means for securing the posts at one end to the body, and locking devices for securing the other ends of the posts to the body, comprising bolts, nuts and socket members, the bolts having an oblique disposition with respect to the posts and top for the purpose of drawing the posts both laterally and vertically to draw them into place and tension them against rattling.

13. In a vehicle body provided with a top, the combination of posts for holding the windows at the sides, means for securing the posts at one end to the body, and locking devices for securing the other ends of the posts to the body, said locking devices comprising cradles secured to the body and T-bolts and nuts secured to the post ends, the said cradles and T-bolts being disposed obliquely to the general direction of the post when in place for the purpose of drawing the posts both laterally and vertically.

In testimony whereof, I sign this specification.

JOHN T. ALLMAND.

Copies of this patent may be obtained for five cents each, by addressing the "Commissioner of Patents, Washington, D. C."